(12) United States Patent
Diez

(10) Patent No.: US 7,806,415 B2
(45) Date of Patent: *Oct. 5, 2010

(54) CYLINDER HEAD GASKET

(75) Inventor: Armin Diez, Lenningen (DE)

(73) Assignee: ElringKlinger AG, Dettingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/265,905

(22) Filed: Nov. 3, 2005

(65) Prior Publication Data

US 2006/0103078 A1 May 18, 2006

(30) Foreign Application Priority Data

Nov. 12, 2004 (DE) .................. 10 2004 054 709

(51) Int. Cl.
*F02F 11/00* (2006.01)

(52) U.S. Cl. ........................................ 277/593

(58) Field of Classification Search ............ 277/591, 277/593–595, 598
See application file for complete search history.

(56) References Cited

U.S. PATENT DOCUMENTS

| | | | | |
|---|---|---|---|---|
| 4,026,565 A * | 5/1977 | Jelinek | ............... | 277/639 |
| 4,480,844 A * | 11/1984 | Kozerski | ............... | 277/591 |
| 5,267,740 A * | 12/1993 | Stritzke | ............... | 277/596 |
| 5,340,126 A * | 8/1994 | Antonini et al. | ............... | 277/601 |
| 6,045,139 A * | 4/2000 | Kinoshita | ............... | 277/594 |
| 6,148,516 A * | 11/2000 | Diez et al. | ............... | 29/888.3 |
| 6,315,303 B1 * | 11/2001 | Erb et al. | ............... | 277/593 |
| 6,336,639 B1 * | 1/2002 | Ishida et al. | ............... | 277/594 |
| 6,390,479 B1 * | 5/2002 | Combet et al. | ............... | 277/594 |
| 6,502,830 B2 * | 1/2003 | Teranishi et al. | ............... | 277/594 |
| 6,588,765 B2 * | 7/2003 | Hiramatsu et al. | ............... | 277/591 |
| 6,758,479 B2 * | 7/2004 | Miyaoh | ............... | 277/598 |
| 2003/0197334 A1 * | 10/2003 | Werz et al. | ............... | 277/593 |

FOREIGN PATENT DOCUMENTS

| | | |
|---|---|---|
| DE | 30 23 782 C2 | 1/1983 |
| DE | 195 20 695 C1 | 7/1996 |
| WO | WO 96/38684 | 12/1996 |

OTHER PUBLICATIONS

U.S. Appl. No. 11/266,505, filed Nov. 2005, Diez.

* cited by examiner

*Primary Examiner*—Thomas B Will
*Assistant Examiner*—Gilbert Y Lee

(57) ABSTRACT

Cylinder head gasket with a ring-shaped combustion chamber sealing element comprising a metallic sealing strand, the sealing element being shaped and held in the cylinder head gasket so that when the gasket is clamped between engine component sealing surfaces and sealing surfaces thereof become relatively displaced parallel to the gasket plane during engine operation, sealing element sections are tiltable about the longitudinal center axis of the sealing strand. The gasket is shaped so that the combustion chamber sealing element is uncovered at the two main surfaces of the gasket and, in cross section perpendicular to the longitudinal center axis of the sealing strand, is of such spherical shape there as to result in surfaces of the sealing element, which are of convex cross section, and the radius of curvature of which is greater than half the thickness of the sealing element perpendicular to the gasket plane.

13 Claims, 3 Drawing Sheets

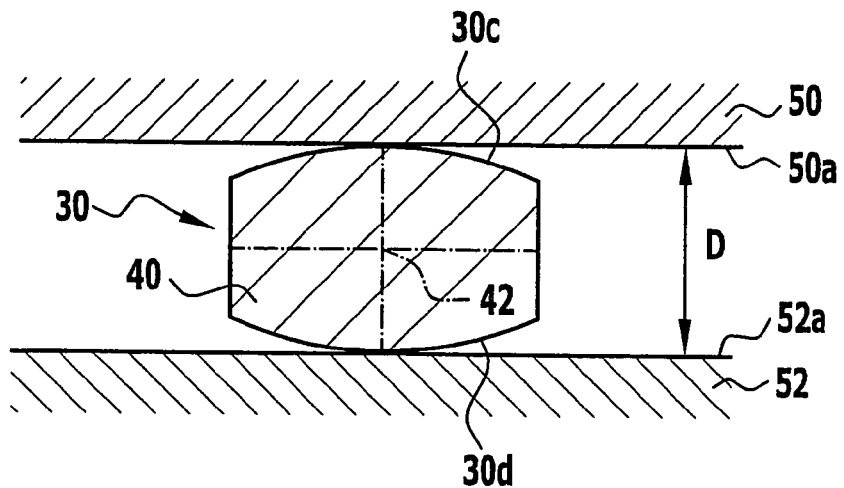
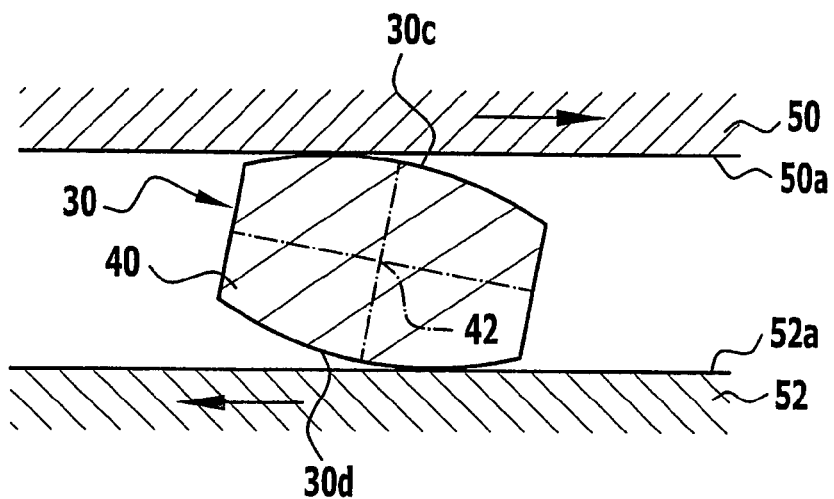
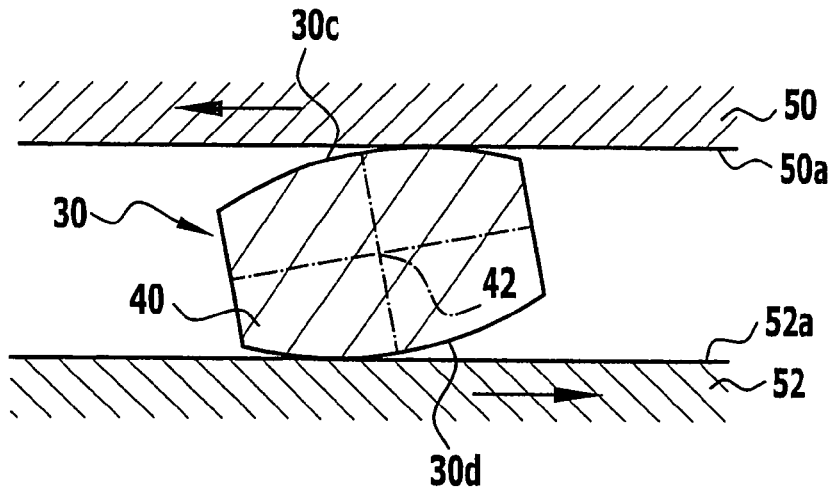

CYLINDER HEAD GASKET

The present disclosure relates to the subject matter disclosed in German application No. 10 2004 054 709.2 of Nov. 12, 2004, which is incorporated herein by reference in its entirety and for all purposes.

BACKGROUND OF THE INVENTION

In a cylinder head gasket, sealing against the greatest pressures occurring during operation of the engine must be effected around a combustion chamber through-opening of the gasket. For this reason, a ring-shaped combustion chamber sealing element of the cylinder head gasket is provided there, which encloses the combustion chamber through-opening, and in the area of which, when the gasket is installed, the latter is pressed to the greatest extent between the engine component sealing surfaces of cylinder head and engine block, i. e., is subjected to the highest pressing forces.

During operation of a reciprocating-piston internal combustion engine, the engine component sealing surfaces delimiting the sealing gap between cylinder head and engine block (possibly including cylinder liners) will unavoidably become displaced relative to one another in the plane of the sealing gap, for example, when owing to the high gas pressure occurring in a cylinder during the ignition, the cylinder head and hence the cylinder head sealing surface arch somewhat and the pressure between the cylinder head gasket, on the one hand, and the engine component sealing surfaces, on the other hand, is reduced somewhat, albeit only for quite a short time in each case. The sliding movements of the two engine component sealing surfaces relative to one another are particularly large in the case of engines with a cylinder head made of a light metal alloy and an engine block made of gray cast iron (owing to the different thermal expansions of these two materials). From the two above-explained causes for these sliding movements of the engine component sealing surfaces it follows that these sliding movements acting on the cylinder head gasket are not identical in size in all areas of the sealing gap. If it is unavoidable that during operation of the engine, the engine component sealing surfaces will become displaced relative to one another also in the area of such a combustion chamber sealing element, above all, during the cyclically occurring, brief reduction in the pressing forces acting on the combustion chamber sealing element during ignition of a cylinder, the sliding movements of the engine component sealing surfaces, in particular of the cylinder head sealing surface, relative to the combustion chamber sealing element result in frictional wear, above all, at the cylinder head sealing surface, but possibly also at the engine block sealing surface and at the combustion chamber sealing element, which may result in failure of the gas sealing around a combustion chamber.

There is disclosed in FIG. 10 of DE-195 12 650-A1 of Elring Klinger GmbH a substantially metallic cylinder head gasket, the gasket plate of which comprises a single sheet steel layer extending over the entire gasket plate, with an edge portion of the sheet steel layer, which surrounds a combustion chamber through-opening of the cylinder head gasket, folded back onto itself so as to form a so-called fold flange ring of U-shaped cross section around the combustion chamber through-opening. Directly beside and radially outside of this fold flange ring there lie on the sheet steel layer three wire rings of circular cross section which are each closed within themselves and are concentric with one another and with the combustion chamber through-opening, and the diameter of these wire rings is somewhat larger than the sheet thickness of the sheet steel layer, so that they project somewhat over the fold flange ring. For this reason, when this known cylinder head gasket is installed, the largest specific surface pressures between the engine component sealing surfaces and the cylinder head gasket occur in the area of these wire rings. The wire rings are to serve to intercept the described sliding movements of the engine component sealing surfaces relative to one another, because upon occurrence of such sliding movements, which are in the order of magnitude of a few tenths of a millimeter, the wire rings can roll on the one engine component sealing surface, and sliding friction is thus to be avoided between the cylinder head gasket and the engine component sealing surface adjacent to the wire rings—on the side of the known cylinder head gasket opposite the wire rings, when the gasket is installed, the sheet steel layer carrying the wire rings is pressed against the other engine component sealing surface, and the inventors of this known construction assumed that frictional wear is avoidable there during operation of the engine if the engine component sealing surface pressed against the wire rings is displaceable without restraint relative to the cylinder head gasket and to the other engine component sealing surface. However, for the following reasons this known cylinder head gasket is not satisfactory in every respect: the wire rings, whose round cross section has a relatively small radius of curvature owing to the given dimensional relations, result in a relatively high specific surface pressure between the wire rings and the engine component sealing surface pressed against these, and during operation of the engine the wire rings can, therefore, cause plastic deformations of this engine component sealing surface. Furthermore, the wire rings are parts which lie loosely on the actual cylinder head gasket, which makes handling of the cylinder head gasket for the purpose of shipment and installation in the engine difficult. Finally, by way of a special design of the cylinder head gasket, the wire rings must be prevented during operation of the engine from becoming displaced in an undesired manner relative to the sheet steel layer carrying them. For this reason, stops were provided for the wire rings in radial direction in relation to the combustion chamber through-opening, namely, on the one hand, in the form of the fold flange ring directly surrounding the combustion chamber through-opening and, on the other hand, by a crown of tongues provided radially outside of the wire rings, which were bent out of the sheet steel layer and bent back onto the latter. Lastly, it will be pointed out that by reducing the number of wire rings, which is desirable in view of a reduction in costs, which is always aimed at, the above-explained problem (plastic deformation of the engine component sealing surface pressed against the wire rings) would be further aggravated, namely as a result of an increase in the specific surface pressure between the remaining wire ring or remaining wire rings and the engine component sealing surface pressed thereagainst.

The object underlying the invention was to so improve the above-explained known cylinder head gasket that the risk of wear occurring during operation of the engine on the engine component sealing surfaces and the cylinder head gasket is at least reduced.

SUMMARY OF THE INVENTION

The invention thus proceeds from a cylinder head gasket with screw holes for cylinder head screws, at least one combustion chamber through-opening, and a ring-shaped combustion chamber sealing element enclosing the combustion chamber through-opening and comprising a metallic sealing strand having a longitudinal center axis, the combustion chamber sealing element being clamped between two supporting surfaces parallel to the gasket plane defined by the cylinder head gasket when the cylinder head gasket is installed, one of the supporting surfaces being formed at least predominantly by an engine component sealing surface of a cylinder head or of an engine block (possibly also by a sealing surface of a chain chase part, a cylinder liner or the like), the combustion chamber sealing element being shaped and held in the cylinder head gasket so that upon displacement of areas of the supporting surfaces, which are located opposite one another and are pressed against a segment (i.e., a longitudinal section) of the combustion chamber sealing element, parallel to the gasket plane and relative to one another, the sealing element segment can be turned or tilted somewhat about the longitudinal center axis of the sealing strand, and to achieve the set object it is proposed in accordance with the invention that the cylinder head gasket be shaped so that for pressing the combustion chamber sealing element directly against the engine component sealing surfaces of cylinder head and engine block, the combustion chamber sealing element is uncovered at the two main surfaces of the cylinder head gasket, i.e., at its top and bottom sides (i.e., is not covered by any element of the cylinder head gasket) and, in cross section perpendicular to the longitudinal center axis of the sealing strand, is of such spherical shape there as to result, at the main surfaces of the cylinder head gasket, in surfaces of the combustion chamber sealing element, which are of convex cross section, and the radius of curvature or radii of curvature of which is or are greater than half the thickness of the combustion chamber sealing element measured perpendicularly to the gasket plane—the curvatures of the two convex surfaces need not be identical, although identical surface profiles are preferred for reasons to be explained hereinblow, nor is it to be concluded from use of the term "radius of curvature" that the cross-sectional profile of such a convex surface is a circular arc, as it may also be another convex roll-on curve, for example, part of an ellipse (the definition used is merely to express the fact that the cross section of the combustion chamber sealing element is not a circle, but is of such configuration that in the case of a specified thickness of the combustion chamber sealing element—measured perpendicularly to the gasket plane—the profiles of the two convex surfaces have a flatter configuration than with a circular cross section of the combustion chamber sealing element).

The advantages of the cylinder head gasket according to the invention are to be seen in the following: firstly, several wire rings are no longer required, but, in the simplest case, a single combustion chamber sealing element is adequate. As the engine component sealing surfaces and the combustion chamber sealing element may not be regarded as being absolutely rigid, but are elastically deformable, also during operation of the engine, albeit only to a relatively slight extent, wider contact zones result between the engine component sealing surfaces and the combustion chamber sealing element and hence lower specific surface pressures, so that the risk of the combustion chamber sealing element resulting in permanent plastic deformations on an engine component sealing surface during operation of the engine is at least reduced. Finally, in the case of a cylinder head gasket according to the invention, the combustion chamber sealing element can roll on both engine component sealing surfaces when these become displaced relative to one another (parallel to the gasket plane defined by the cylinder head gasket), so that no appreciable frictional wear can occur at either of the two engine component sealing surfaces.

Substantially metallic cylinder head gaskets with combustion chamber through-openings enclosed by ring-shaped elements of spherical cross section are known per se (see DE-195 20 695-C1 of Elring Klinger GmbH and U.S. Pat. No. 6,499,743), however, these known ring-shaped elements of spherical cross section are so-called stoppers, which are formed on a middle layer of a three-layered gasket and are to prevent excessive flattening of sealing beads which were stamped in the two outer sheet steel layers of the gasket and enclose the combustion chamber through-openings. However, in these spherical stoppers the crests of the convex surfaces of each stopper always lie exactly one over the other (in a plan view of the gasket plate), quite apart from the fact that according to the drawings of the two above-mentioned documents the sheet metal layers from which the stoppers were formed have such a large sheet thickness that even small tilting movements of the stoppers during operation of the engine appear totally impossible.

Owing to the high pressing forces necessary for reliable gas sealing around a combustion chamber through-opening and the thus required compressive strength of the combustion chamber sealing element, it is recommended that the cross section of the sealing strand forming the latter be made to correspond approximately to a rectangle with spherical longitudinal sides.

In order that the combustion chamber sealing element will always roll on the engine component sealing surfaces and no sliding friction will occur during operation of the engine, embodiments are preferred, in which the thickness and the compressive strength of the combustion chamber sealing element and also the material thereof are adapted to the specified materials of the engine component sealing surfaces and to the tightening torque of the cylinder head screws that is always specified for each engine, so that upon occurrence of the displacements of the engine component sealing surfaces relative to one another during operation of the engine, the combustion chamber sealing element only rolls on and does not slide on the engine component sealing surfaces. In this connection it must be borne in mind that each cylinder head gasket is always constructed for a specific engine, so that the gasket designer is provided with the specified materials for the engine component sealing surfaces and the specified tightening torque to be used for the cylinder head screws during assembly of the engine.

As will already be apparent from the aforesaid, the width of the sealing gap between the sealing surfaces of cylinder head and engine block (i. e. the spacing of these two sealing surfaces from each other) which is to be sealed by the cylinder head gasket, does not remain absolutely constant everywhere during operation of the engine, above all, owing to the arching of the cylinder head sealing surface when a cylinder is ignited. One should, nevertheless, aim at this sealing gap not being widened by the tilting movements of the combustion chamber sealing element, and it is, therefore, recommended that the convex surfaces of the combustion chamber sealing element be designed so that the spacing of planes running parallel to the gasket plane and tangentially to these surfaces, upon tilting of these surfaces about the longitudinal center axis of the sealing strand, i. e. in the course of the rolling movements of the combustion chamber sealing element on the engine component sealing surfaces, remains at least substantially constant.

Similarly to the wire rings of the cylinder head gasket according to FIG. 10 of DE-195 12 650-A1, the combustion chamber sealing element of the cylinder head gasket according to the invention could also lie loosely in a corresponding opening in the gasket plate of the cylinder head gasket. However, this has the disadvantages explained hereinabove in connection with this known cylinder head gasket. Embodiments of the cylinder head gasket according to the invention are, therefore, recommended, in which the combustion chamber sealing element is held in the cylinder head gasket by flexible, web-like or tongue-like holding elements which extend approximately transversely outwardly away from the combustion chamber sealing element and remain at least substantially flexible when the cylinder head gasket is installed, and the holding elements are arranged in spaced relation to one another along the circumference of the combustion chamber sealing element. All of the disadvantages explained hereinabove in connection with the known cylinder head gasket are thus eliminated, and with regard to the flexibility of the holding elements still present when the cylinder head gasket is installed, it is pointed out that these need only be flexible insofar as they allow and do not impede at least to any appreciable extent the above-explained roll-on movements of the combustion chamber sealing element. Since the clamping forces are applied by the cylinder head screws when the cylinder head gasket is installed, the specific surface pressures in relation to the unit of area are greatest in the vicinity of the cylinder head screws and hence of the screw holes of the cylinder head gasket. As the above-explained sliding movements are, consequently, smallest in the vicinity of these screw holes, it is advantageous to arrange the holding elements at such locations on the combustion chamber sealing element as lie closest to one of the screw holes respectively, i.e., each holding element is directed towards a respective one of the screw holes. With such a construction the holding elements obstruct the above-explained roll-on movements least of all.

The sliding movements of the engine component sealing surfaces relative to one another, which are caused by the changing gas pressures in the cylinders and the different thermal expansions of cylinder head and engine block are also not of identical size throughout in view of the area-wise varying specific surface pressures between the engine component sealing surfaces and the cylinder head gasket (as cylinder head and engine block cannot be regarded as absolutely rigid components, the clamping forces applied by the cylinder head screws decrease as the distance from the cylinder head screws increases, and the gas pressures resulting in the arching of the cylinder head sealing surface only occur in the cylinders of the engine). A preferred embodiment of the cylinder head gasket according to the invention is, therefore, characterized in that in order to take into consideration area-wise varying displacements of the engine component sealing surfaces relative to one another, the sealing strand forming the combustion chamber sealing element is twistable (of course, elastically) about its longitudinal axis, in order that adjacent sections or segments of the sealing strand can perform tilting or roll-on movements of different size and sliding friction is avoided between the engine component sealing surfaces and the combustion chamber sealing element and also permanent breakages cannot occur in the combustion chamber sealing element.

In today's preferred, at least substantially metallic cylinder head gaskets, their gasket plate has one or several sheet steel layers lying one over the other, and, therefore, a particularly advantageous embodiment of the cylinder head gasket according to the invention is characterized in that the combustion chamber sealing element forms one piece with the sheet steel layer or one of the sheet steel layers and is an integral component of the latter. For example, with a three-layered cylinder head gasket according to the invention, the combustion chamber sealing element could be a component of the middle layer, while the two cover layers have openings of the same size as or slightly larger than the outer diameter of the combustion chamber sealing element, whose thickness is of such size that it is pressed against the sealing surfaces of cylinder head and engine block when the cylinder head gasket is installed and pressed. The two outer sheet steel layers could then also be provided with sealing beads which are deformable in a spring-elastic manner in their height and—in a plan view of the cylinder head gasket—enclose the combustion chamber sealing element so as to create further sealing zones around each combustion chamber through-opening radially outside of the combustion chamber sealing element. In principle, the above-mentioned holding elements could be attached to the combustion chamber sealing element and/or to the sheet steel layer holding the combustion chamber sealing element, for example, by spot welding. An embodiment is, however, preferred, in which the sheet steel layer has slot-shaped openings, produced, in particular, by punching, between the holding elements at the outer circumference of the combustion chamber sealing element, so that the holding elements pass over seamlessly into the sheet steel layer and the combustion chamber sealing element. In this case, the combustion chamber sealing element can be formed from the sheet steel layer itself by reshaping it, for example, by upsetting and stamping, but preferably by the combustion chamber sealing element being formed by an edge portion of the sheet steel layer which surrounds the combustion chamber through-opening and is folded back onto itself.

The invention is particularly well suited for cylinder head gaskets whose gasket plate has only one sheet steel layer which extends at least substantially over the entire gasket plate and may then be provided in a manner known per se on one or both sides over the entire surface or partially with a, preferably elastomeric, coating, for example, for the purpose of so-called microsealing, i. e., compensation of surface roughnesses of the sealing surfaces of cylinder head and engine block.

If one or both of the engine component sealing surfaces has or have a locally differing stiffness, which may be due to cavities in the engine components, it is recommended that the combustion chamber sealing element be so designed that its thickness and/or its width and/or its hardness along the circumference of the combustion chamber sealing element change in dependence upon the locally differing stiffness of the engine component sealing surfaces so as to ensure that the combustion chamber sealing element will always be coupled everywhere in a frictionally engaged manner to the engine component sealing surfaces, i. e., that the combustion chamber sealing element will at least substantially only roll and not slide on the engine component sealing surfaces throughout. Since the engine in which the gasket is to be installed is always preselected for the designer of a cylinder head gasket, the combustion chamber sealing element profile required therefor can be determined by an FEM calculation (finite element method).

Further features, advantages and details of the invention will be apparent from the appended drawings and the following description of a particularly advantageous embodiment of the cylinder head gasket according to the invention.

BRIEF DESCRIPTION OF THE DRAWINGS

FIGS. 3A to 3C show schematic sections through an area of a combustion chamber sealing element of the cylinder head gasket in the installed state, and through areas of a cylinder head and an engine block, which are adjacent to the combustion chamber sealing element and between which the combustion chamber sealing element is clamped, with FIG. 3A showing the combustion chamber sealing element in its normal position, and FIGS. 3B and 3C showing the section of the combustion chamber sealing element shown schematically in FIG. 3A, but after this has been tilted into two different positions as a result of sliding movements of the two engine component sealing surfaces relative to one another.

DETAILED DESCRIPTION OF THE INVENTION

Figure 1:
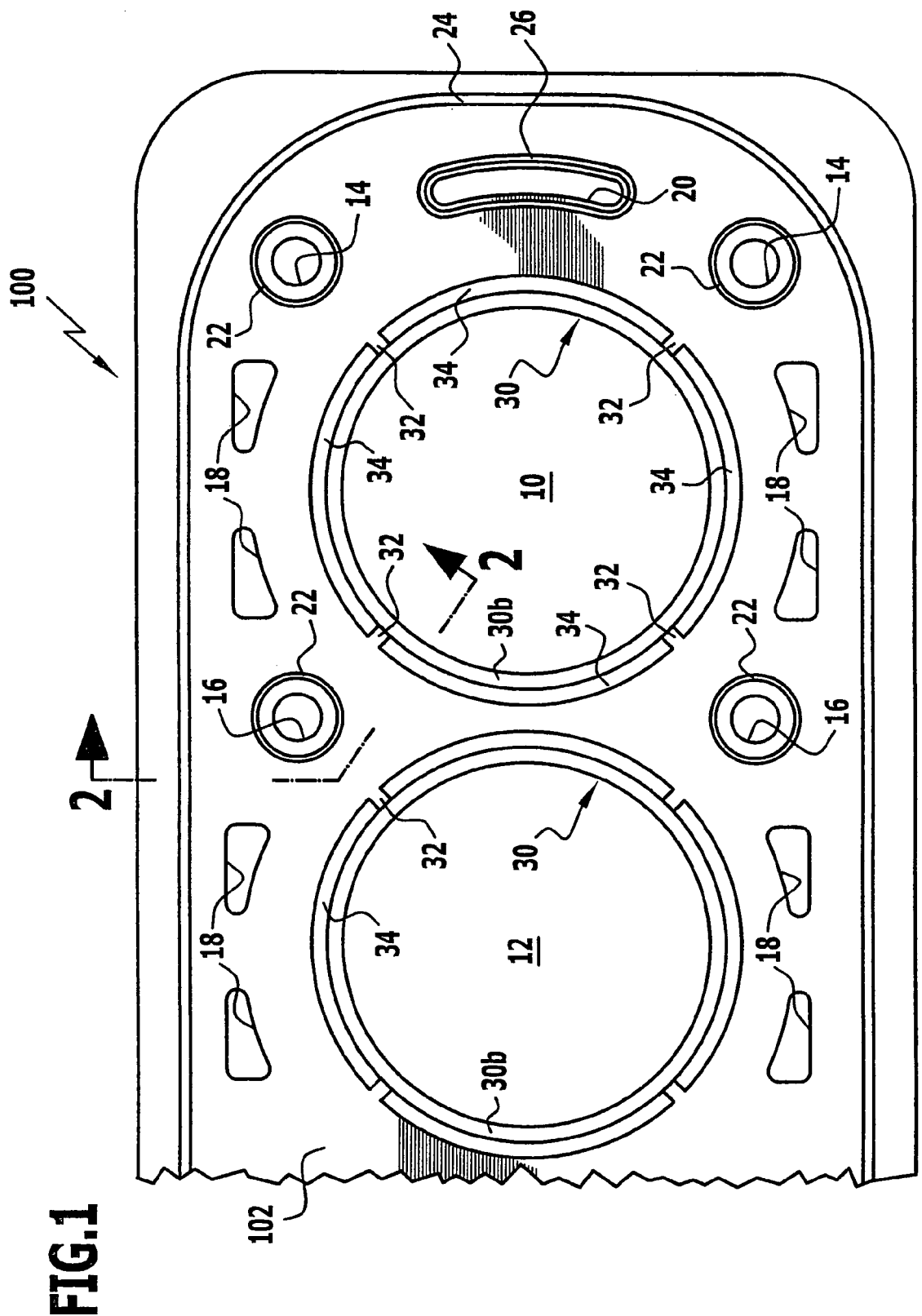
FIG. 1 shows a plan view of a section of the cylinder head gasket.

The cylinder head gasket shown in FIG. 1 is to consist at least substantially of a single, one-piece sheet metal layer 102, which forms a gasket plate 100, in which several combustion chamber openings 10, 12, screw holes 14, 16 for cylinder head screws, water holes 18 and several oil holes 20 are formed—the cylinder head gasket shown is intended for a multi-cylinder in-line engine, but the invention may also be applied to a cylinder head gasket for a single-cylinder engine or to so-called single gaskets for a multi-cylinder engine in which a separate cylinder head and a separate cylinder head gasket are provided for each cylinder.

Figure 2:
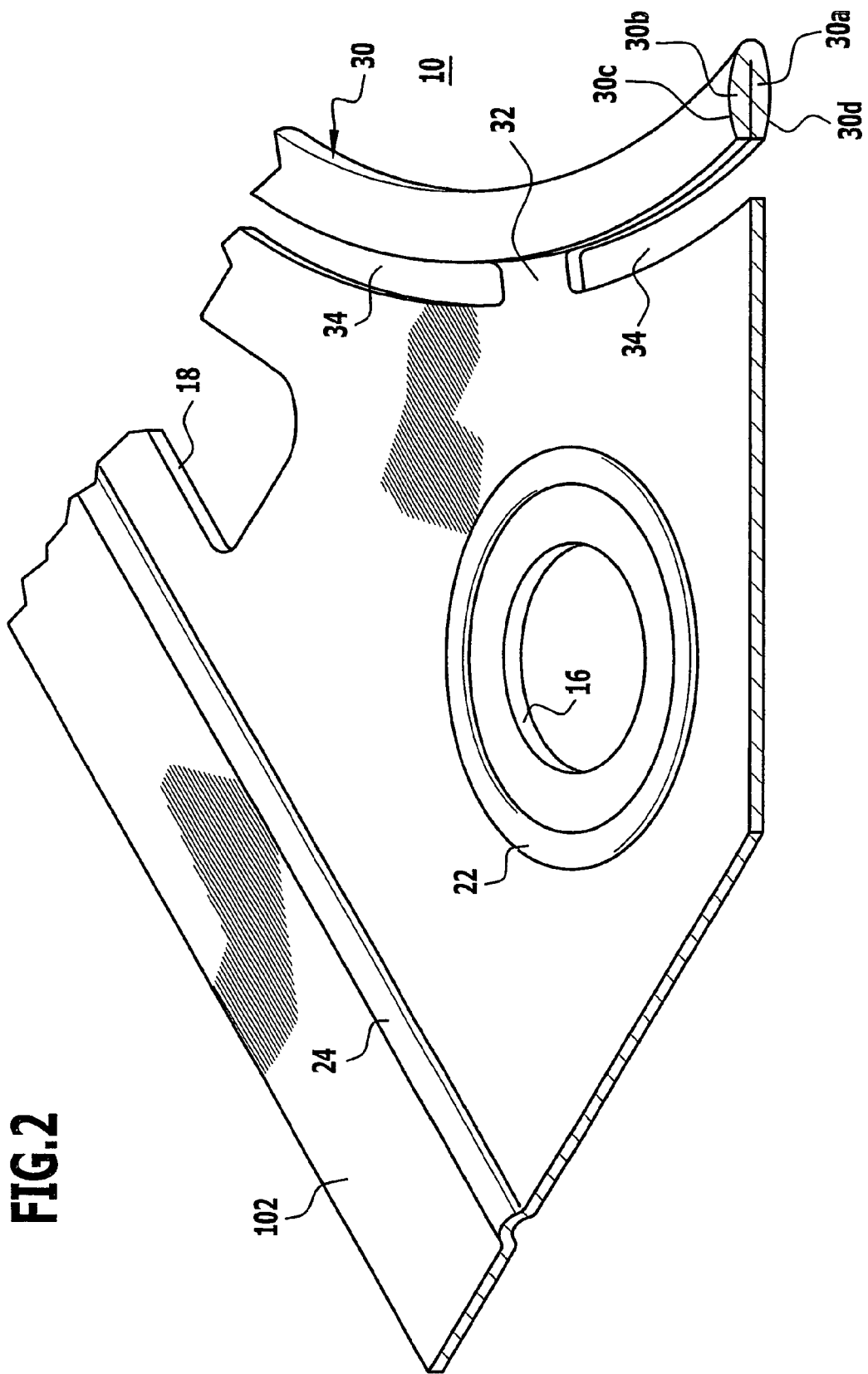
FIG. 2 shows an area of this cylinder head gasket in an isometric section corresponding to line 2-2 in FIG. 1.

In accordance with FIGS. 1 and 2, each of the screw holes 14, 16 is enclosed by a circular ring-shaped bead 22. This is a full bead which is stamped into the actual sheet metal layer 102 consisting of sheet spring steel and is elastic with respect to its height. Also stamped in the sheet metal layer 102 is a water sealing bead 24 which is similarly elastic with respect to its height, i.e., elastically deformable in its height. This is also a full bead, which extends in the proximity of the periphery of the gasket plate around the latter, and in a plan view of the cylinder head gasket is to be an approximately oval structure closed within itself and enclosing all combustion chamber openings, screw holes, water holes and oil holes. Finally, there are stamped in the sheet metal layer 102 sealing beads 26, which are elastic with respect to their height.

These serve to seal the oil holes 20, each surround the latter in a closed manner and are likewise to be designed as full beads. In the illustrated embodiment, all of the beads 22, 24 and 26 project above one and the same main surface of the gasket plate 100, i. e., their convex sides face the viewer of FIG. 1. Mention is, however, made of the fact that these beads need not be full beads, but could also be so-called half beads, with the step formed by such a half bead 22 or 26, starting from the associated hole 14 or 16 or 20, projecting in the bead area in the direction towards the viewer of FIG. 1, and the step formed by the water sealing bead 24, starting from the edge of the gasket plate 100, rising in the direction towards the viewer of FIG. 1.

Around each of the combustion chamber openings 10, 12, the gasket plate 100 is provided with a circular ring-shaped sealing element 30, which in the illustrated embodiment is formed by a circular ring-shaped portion of the sheet steel layer 102 enclosing the respective combustion chamber opening, which has been folded back onto itself and forms a fold flange ring. As will be apparent from FIG. 2, this consists of a base portion 30a and a fold-back portion 30b. The base portion 30a passes over seamlessly via four holding elements 32 in the form of narrow webs into the actual sheet steel layer 102, and circular arc-shaped slots 34, which have been punched out of the sheet steel layer 102, extend around the combustion chamber sealing element 30 between the holding elements 32. As will be apparent from FIG. 1, each of the holding elements 32 is located close to one of the screw holes 14, 16 and is directed towards its center. Taking into account the sheet thickness and the spring-elastic characteristics of the sheet steel layer 102, the width and the length of the holding elements 32 are to be of such dimensions that the holding elements 32 are sufficiently flexible, and these holding elements do not obstruct at least to any appreciable extent the tilting movements of the combustion chamber sealing element 30, which will be described hereinblow.

As will be apparent from FIG. 2, the combustion chamber sealing element 30 has an upper and a lower convex surface 30c and 30d, respectively. The purpose of these convex surfaces will be explained hereinblow in conjunction with FIGS. 3A to 3C. This profiling of the combustion chamber sealing element 30 is preferably achieved by a stamping procedure, and the stamping should be performed after the folding-back of the fold-back portion 30b. The combustion chamber sealing element 30 may also be provided with a height profile and/or width profile and/or hardness profile along its circumference in order, for example, to take into consideration locally varying stiffnesses of the engine components.

In order that the combustion chamber sealing element 30 is evened out with respect to the center plane of the actual sheet steel layer 102 and does not project to a different extent over the two main surfaces of the actual sheet steel layer 102, it is advisable to design the stamping tool used for the stamping procedure such that in the course of the stamping procedure the web-like holding elements 32 will be bent with a slight S-shape (in a longitudinal section through the respective holding element).

FIGS. 3A to 3C show a schematic cross section through a combustion chamber sealing element 30 which is formed by a circular ring-shaped metallic sealing strand 40 whose longitudinal center axis was designated 42. The sealing strand 40 does, therefore, not have to be a circular ring-shaped portion of a metal sheet, which is folded back onto itself, but could also be formed by a metallic ring obtained, for example, by a punching procedure, which initially has a cross section in the form of a lying rectangle and by means of reshaping in a stamping tool has then been provided with the convex surfaces 30c and 30d.

In FIGS. 3A to 3C, part of a cylinder head was designated 50 and part of an engine block 52, a sealing surface of the cylinder head was designated 50a and a sealing surface of the engine block 52a.

FIG. 3A shows the combustion chamber sealing element 30 in its normal position after installation of the cylinder head gasket when the engine is cold and out of operation. The sliding movements of the sealing surfaces 50a, 52a which occur when the engine is running and while the engine is heating up were denoted by arrows pointing in opposite directions in FIGS. 3B and 3C, and, of course, one engine component sealing surface may also remain stationary and only the other engine component sealing surface become displaced. During such relative displacements at least certain sections (or imaginary segments) of the combustion chamber sealing element 30 or of the sealing strand 40 are tilted about the longitudinal center axis 42 of the sealing strand, and the convex surfaces 30c and 30d are only to roll on the engine component sealing surfaces 50a and 52a and are not to slide on these sealing surfaces. The roll-on curves forming the cross-sectional profile of the convex surfaces 30c and 30d are to be designed so that the tilting movements of the combustion chamber sealing element 30 or of a segment of the sealing strand 40 about its longitudinal center axis 42 do not result in a widening of the so-called sealing gap between the engine component sealing surfaces 50a, 52a, so that the spacing of the two engine component sealing surfaces from one another, designated "D" in FIG. 3A, remains constant. In the embodiment shown, the above-mentioned roll-on curves are to be circular arcs whose radius is many times greater than half the thickness of the sealing strand 40 (measured in vertical direction in FIG. 3A).

The tilting movements depicted in FIGS. 3A and 3C are not to be obstructed at least to any appreciable extent by the web-like holding elements 32, i. e., these holding elements should be sufficiently flexible to allow such tilting movements without permanent breakages occurring in the holding elements 32 or their transitions to the combustion chamber sealing element 30 and the actual sheet steel layer 102 occurring during operation of the engine.

If, in a cylinder head gasket according to the invention, adjacent combustion chamber openings, such as combustion chamber openings 10 and 12, lie very close to each other, the space for a web-like area of the actual sheet steel layer 102 and two slots 32 may prove insufficient at the location at which the combustion chamber sealing elements 30 allocated to the two combustion chamber openings come closest to each other. This problem is known with cylinder head gaskets in which sealing is effected directly around the combustion chamber openings by circular ring-shaped beads of the sheet steel layer. In such a case, the sealing beads of two adjacent combustion chamber openings pass over into each other at the constriction between these combustion chamber openings, so that at the narrowest point only a single bead section remains, which has a straight-lined configuration and from which the two sealing beads extend away in approximately the shape of a V, so that in the constriction a bead configuration results, which has the shape of two Ys, which pass over into each other with their "feet". In the case of combustion chamber openings of a cylinder head gasket according to the invention which lie extremely close to each other, the two adjacent combustion chamber sealing elements may analogously pass over into each other in the constriction and similarly form a "double Y configuration", and then no slots 34 and possibly not any narrow web area of the actual sheet steel layer 102 either are present in the constriction.

The invention claimed is:

1. A cylinder head gasket comprising an at least substantially metallic gasket plate with at least one sheet steel layer, screw holes for cylinder head screws, at least one combustion chamber through-opening, and a ring-shaped combustion chamber sealing element enclosing the combustion chamber through-opening and comprising an elastic metallic sealing strand having a longitudinal center axis, the combustion chamber sealing element being clamped between two supporting surfaces parallel to the gasket plane defined by the cylinder head gasket when the cylinder head gasket is installed, one of said supporting surfaces being formed at least predominantly by an engine component sealing surface of a cylinder head or of an engine block, the combustion chamber sealing element being shaped and held in the cylinder head gasket so that upon displacement of areas of the supporting surfaces, which are located opposite one another and are pressed against a section of the combustion chamber sealing element, parallel to the gasket plane and relative to one another, the sealing element section is elastically tiltable about the longitudinal center axis of the sealing strand, wherein the combustion chamber sealing element is held in the cylinder head gasket by flexible holding elements each of which has the shape of a web or tongue and which extend transversely outwardly from the combustion chamber sealing element and are at least substantially unpressed when the cylinder head gasket is installed, said holding elements being arranged in spaced relation to one another along the circumference of the combustion chamber sealing element, wherein said combustion chamber sealing element is the only sealing element for said combustion chamber through-opening, and wherein for pressing the combustion chamber sealing element against the engine component sealing surfaces of the cylinder head and engine block, the combustion chamber sealing element includes uncovered surfaces at the two main surfaces of the cylinder head gasket and, in cross section perpendicular to the longitudinal center axis of the sealing strand, is at each of said two main surfaces of such spherical shape there as to result, at the two main surfaces of the cylinder head gasket, in the uncovered surfaces of the combustion chamber sealing element, which are of convex cross section around the combustion chamber through-opening also when the gasket is installed and pressed, and the radius of curvature of which is greater than half the thickness of the combustion chamber sealing element measured perpendicularly to the gasket plane.

2. The cylinder head gasket in accordance with claim 1, wherein the cross section of the sealing strand corresponds approximately to a rectangle with spherical longitudinal sides.

3. The cylinder head gasket in accordance with claim 1, wherein the thickness and the compressive strength of the combustion chamber sealing element and also the material thereof are adapted to the specified materials of the engine component sealing surfaces and to the specified tightening torque of the cylinder head screws so that upon occurrence of displacements of the engine component sealing surfaces relative to one another during operation of the engine, the combustion chamber sealing element does at least substantially only roll on and not slide on the engine component sealing surfaces.

4. The cylinder head gasket in accordance with claim 1, wherein the convex surfaces of the combustion chamber sealing element are shaped so that the spacing of planes running parallel to the gasket plane and tangentially to these convex surfaces remains at least substantially constant when the latter tilt about the longitudinal center axis of the sealing strand.

5. The cylinder head gasket in accordance with claim 1, wherein the holding elements are arranged at locations on the combustion chamber sealing element, each of which lies closest to one of the screw holes.

6. The cylinder head gasket in accordance with claim 1, wherein the sealing strand is elastically twistable about its longitudinal axis in order to take into consideration area-wise varying displacements of the engine component sealing surfaces relative to one another.

7. The cylinder head gasket in accordance with claim 1, wherein the combustion chamber sealing element forms one piece with the sheet steel layer and is an integral component of the latter.

8. The cylinder head gasket in accordance with claim 1, wherein the sheet steel layer has elongate openings at the outer circumference of the combustion chamber sealing element between the holding elements.

9. The cylinder head gasket in accordance with claim 7, wherein the combustion chamber sealing element is formed by an edge portion of the sheet steel layer, which surrounds the combustion chamber through-opening and is folded back onto the sheet steel layer.

10. The cylinder head gasket in accordance with claim 1, wherein the gasket plate comprises only one sheet steel layer extending at least substantially over the entire gasket plate.

11. The cylinder head gasket in accordance with claim 1, wherein the thickness of the combustion chamber sealing element along its circumference changes in dependence upon the locally varying stiffness of the engine component sealing surfaces.

12. The cylinder head gasket in accordance with claim 1, wherein the width of the combustion chamber sealing element along its circumference changes in dependence upon the locally varying stiffness of the engine component sealing surfaces.

13. The cylinder head gasket in accordance with claim 1, wherein the hardness of the combustion chamber sealing element along its circumference changes in dependence upon the locally varying stiffness of the engine component sealing surfaces.

* * * * *